United States Patent
Liao

(10) Patent No.: US 6,947,369 B2
(45) Date of Patent: Sep. 20, 2005

(54) SLED APPARATUS FOR OPTICAL HEAD FRAME OF OPTICAL DISK DRIVE

(75) Inventor: Cheng-Yao Liao, Taipei (TW)

(73) Assignee: Lite-on IT Corporaiton, Taipei (TW)

( * ) Notice: Subject to any disclaimer, the term of this patent is extended or adjusted under 35 U.S.C. 154(b) by 348 days.

(21) Appl. No.: 10/242,771

(22) Filed: Sep. 13, 2002

(65) Prior Publication Data

US 2004/0052198 A1 Mar. 18, 2004

(51) Int. Cl.[7] .............................................. G11B 21/02
(52) U.S. Cl. ...................................................... 369/223
(58) Field of Search .............................. 369/223, 219; 360/261.3

(56) References Cited

U.S. PATENT DOCUMENTS 5,889,638 A * 3/1999 Kabasawa et al. ........ 360/261.3
6,058,098 A * 5/2000 Kato ........................... 369/219
6,700,859 B2 * 3/2004 Oono et al. ................. 369/223

FOREIGN PATENT DOCUMENTS

JP  2000030381 A * 1/2000

* cited by examiner

Primary Examiner—Tianjie Chen
(74) Attorney, Agent, or Firm—Birch, Stewart, Kolasch & Birch, LLP

(57) ABSTRACT

A sled apparatus for an optical head frame of an optical disk drive comprises a lead screw, an elastic element and two opposing racks located on an upper side and a lower side of the lead screw. The racks have respectively one end fixedly fastened to the optical head frame and another end engaged with each other through the elastic element for the two racks to clamp the lead gear and engage with screw threads of the lead gear such that two ends of the lead screw subject to reduced pre-load force and friction force incurred to the lead screw during rotation also decreases. As a result, rotation can be transmitted to the lead screw smoothly and reliably to move the optical head frame rapidly and smoothly.

8 Claims, 6 Drawing Sheets

SLED APPARATUS FOR OPTICAL HEAD FRAME OF OPTICAL DISK DRIVE

FIELD OF THE INVENTION

The invention relates to a sled apparatus for an optical head frame of optical disk drives and particularly a sled apparatus that employs an upper rack and a lower rack to change action and reaction force applying locations of a pre-load force on the optical head frame of optical disk drives.

BACKGROUND OF THE INVENTION

Accompanying the rapid technology progress of optical information media in recent years, reading speed of optical disk drives which serve as computer peripheral devices also has great improvements.

However, in practical applications the read write speed of optical disk drives is limited by related components such as motor spindle rotation speed, frequency spectrum of decoding chips, optical head characteristics and sledding speed of the optical head frame, etc. To effectively improve the read write speed of the optical disk drives, the performances of the associated components also have to be enhanced.

During operation of the optical disk drives, the sled mechanism of the optical head frame transports the optical head to a preliminary seek position where the data to be read are located, then an objective lens performs a fine search process to read the data on the optical disk. Hence increasing the moving speed of the sled mechanism of the optical head frame to transport the optical head quickly can effectively reduce data reading time of the optical disk drives. Furthermore, besides for broadcasting video images, in most other applications the optical disk drives are operated under random access mode. The design of the sled mechanism directly affects data retrieving speed and reliability of the optical disk drives.

In the designs of optical disk drive for reading data across a large track span, the optical head is driven by a sled mechanism which generally have two types of constructions as follows:

1. driven by a DC motor through rack and pinion; or
2. driven by a stepping motor through lead screw and rack.

Referring to FIG. 1, a conventional sled mechanism 1a comprises a lead screw 10a, a rack 11a and an elastic blade 12. The lead screw 10a is driven by a motor 13a to rotate, and has two ends supported by a support frame 14a. The rack 11a includes a bracket 15a and a resilient section 16a which has a teeth section 17a located thereon. The elastic blade 12 has one end fastened to the bracket 15a through a screw 18a and another end exerting a resilient force on the resilient section 16a to make the teeth section 17a engaging with the screw threads 19a of the lead screw 10a.

The bracket 15a of the rack 11a is attached to the optical head frame (not shown in the drawing). Through the driving (positive rotation or reverse rotation) of the motor 13a, the optical head (also not shown in the drawing) may be moved reciprocally and axially and horizontally along the lead screw 10a.

Referring to FIG. 2, in the sled mechanism 1a set forth above, the elastic blade 12a provides the resilient section 16a with sufficient pre-load force to make the teeth section 17a of the rack 11a engaging with the screw threads 19a of the lead screw 10a.

However, the action force F of the pre-load force incurs two reaction forces A and B at two ends of the sled screw 10a supported by the support frame 14a. Hence the rotation of the sled screw 10a driven by the motor 13a has to overcome the friction force resulting from the reaction forces A and B. This phenomenon will impair the operation smoothness and reliability of the sled mechanism 1a, and adversely affects data reading speed of the optical disk drive. The conventional construction of the sled mechanism previously discussed indicates that there are still rooms for improvement.

SUMMARY OF THE INVENTION

The primary object of the invention is to provide an improved sled apparatus for an optical head frame of optical disk drives that changes action and reaction force locations of the pre-load force to reduce loading forces at two ends of the sled screw thereby to allow the sled apparatus achieving smoother and more reliable transmission, and to allow the optical head frame moving faster.

To attain the foregoing objects, the sled apparatus of the invention consists of a sled screw, an elastic element and two opposing racks. The two racks are located respectively on an upper side and a lower side of the lead screw, and have one end attached to an optical head frame and another end engaged and coupled by the elastic element such that the two racks clamping the sled screw and engaging with the screw threads of the sled screw. As a result, the action force and reaction force of the pre-load force applying on the two racks are changed to achieve the objects set forth above.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
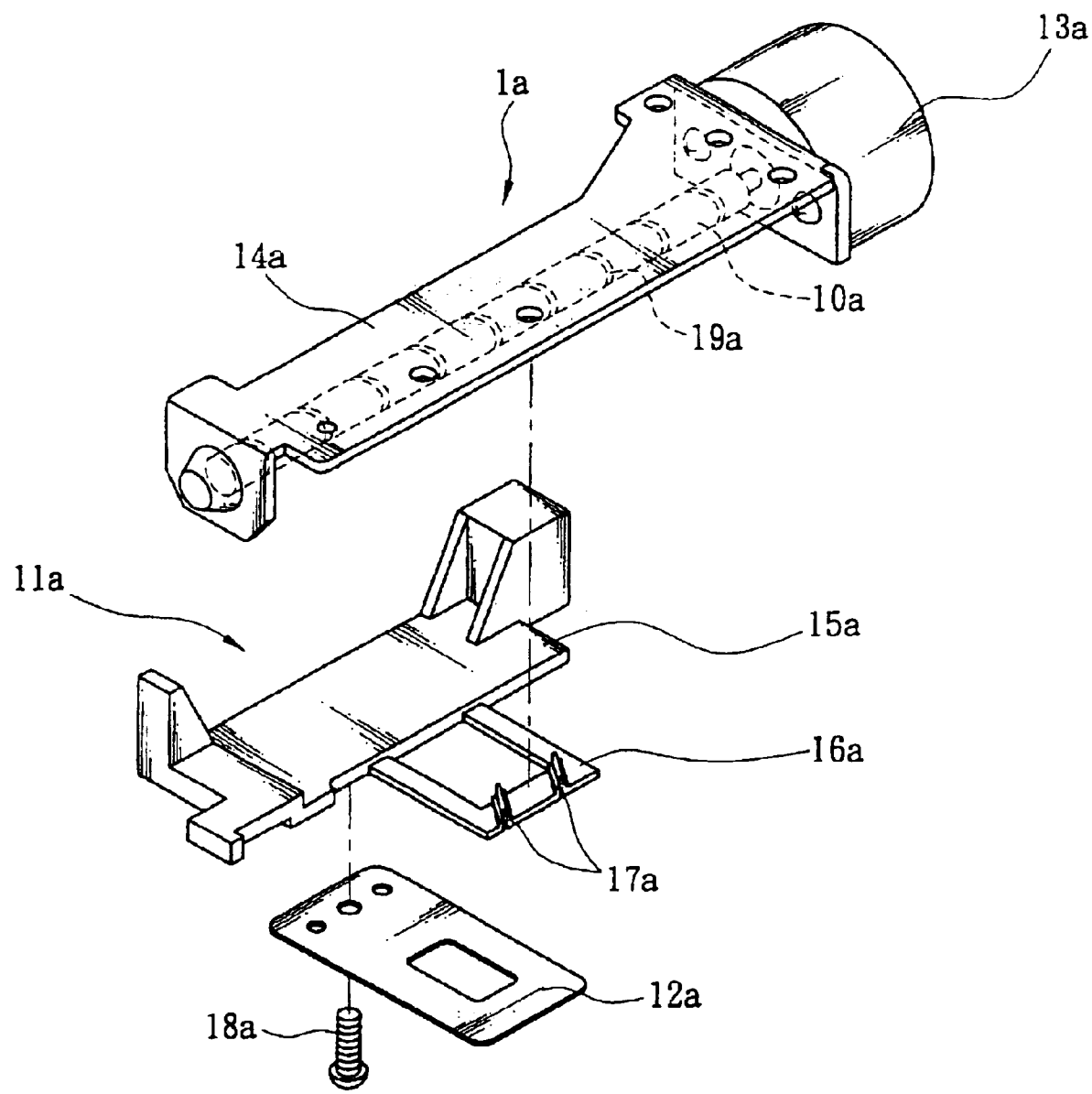
FIG. 1 is an exploded view of a conventional sled mechanism of an optical head frame.
Figure 2:
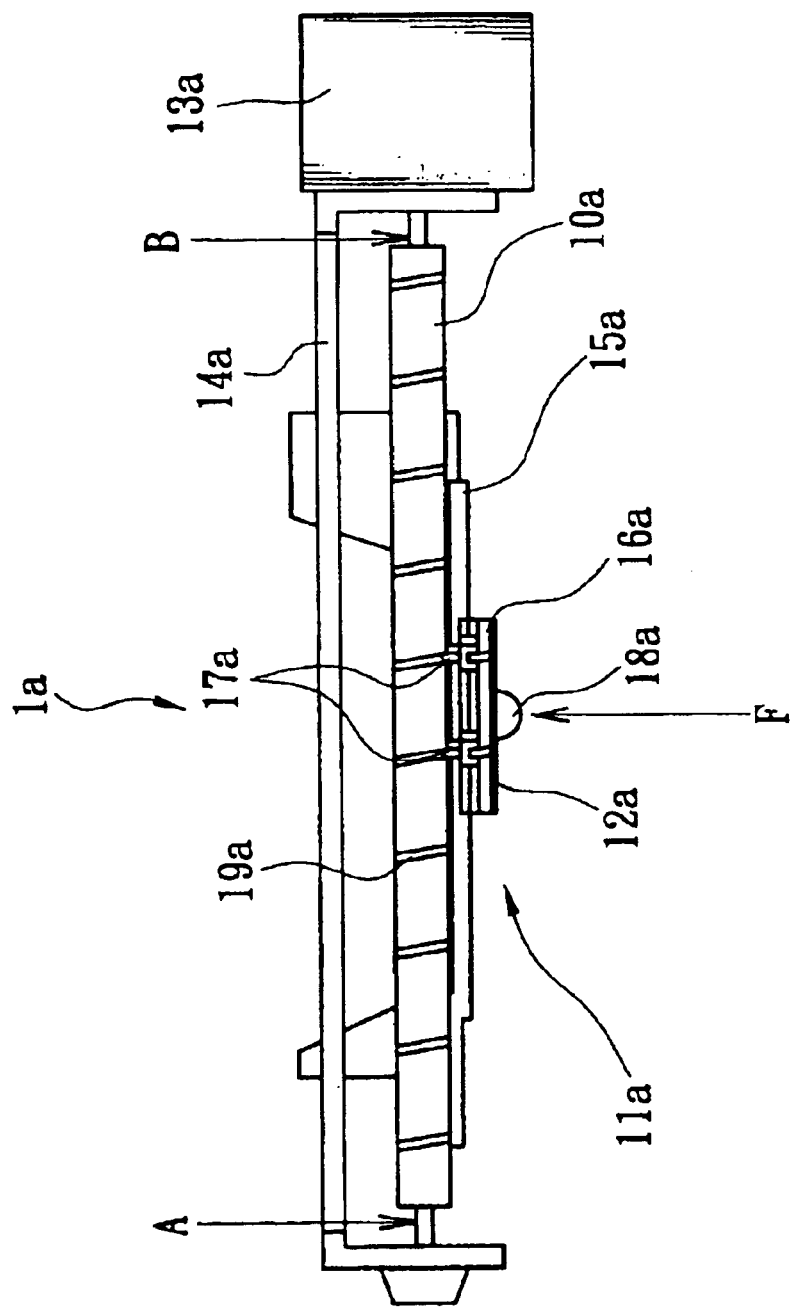
FIG. 2 is a front view of a conventional sled mechanism of an optical head frame.
Figure 3:
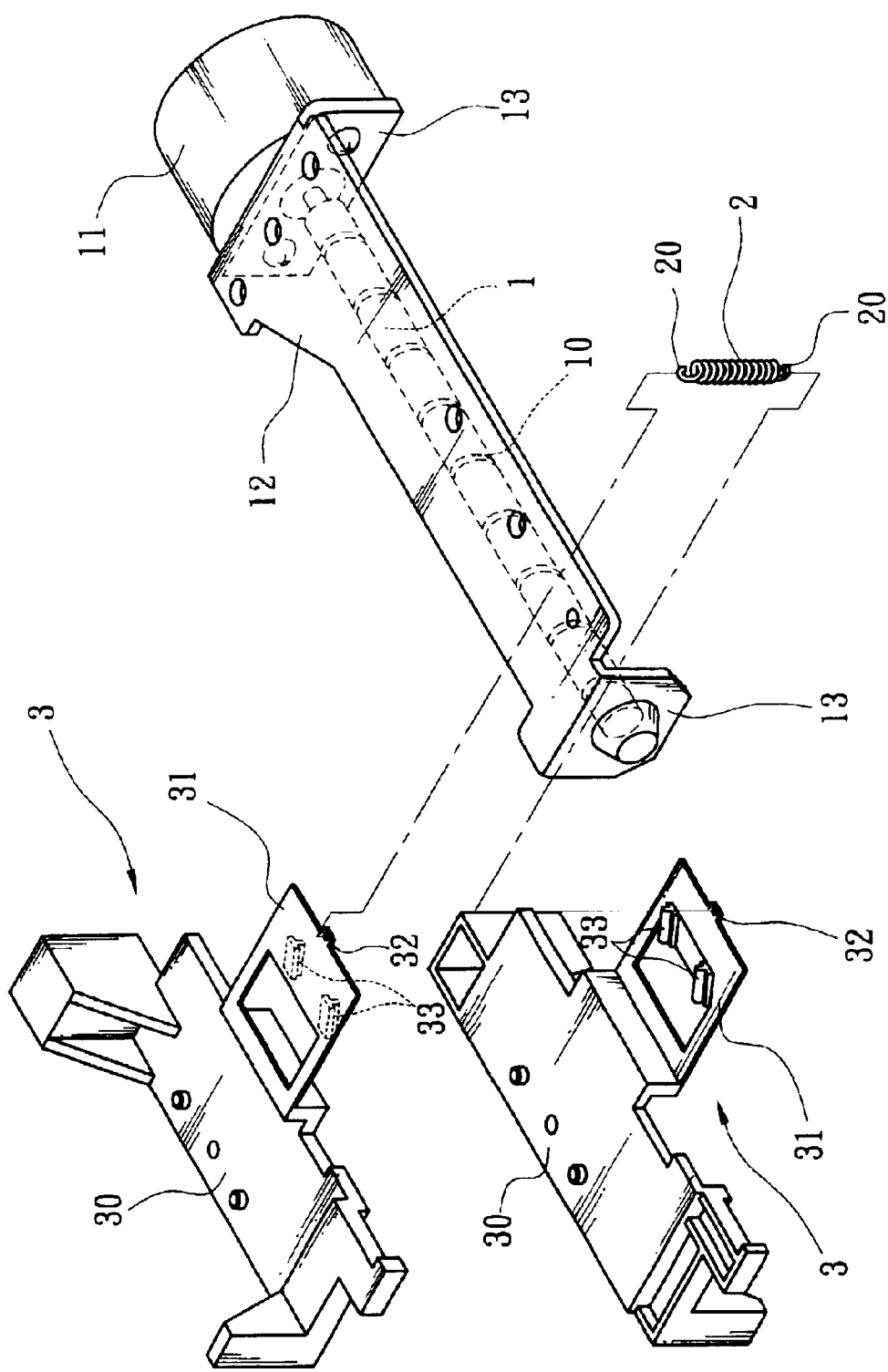
FIG. 3 is an exploded view of the invention.
Figure 4:
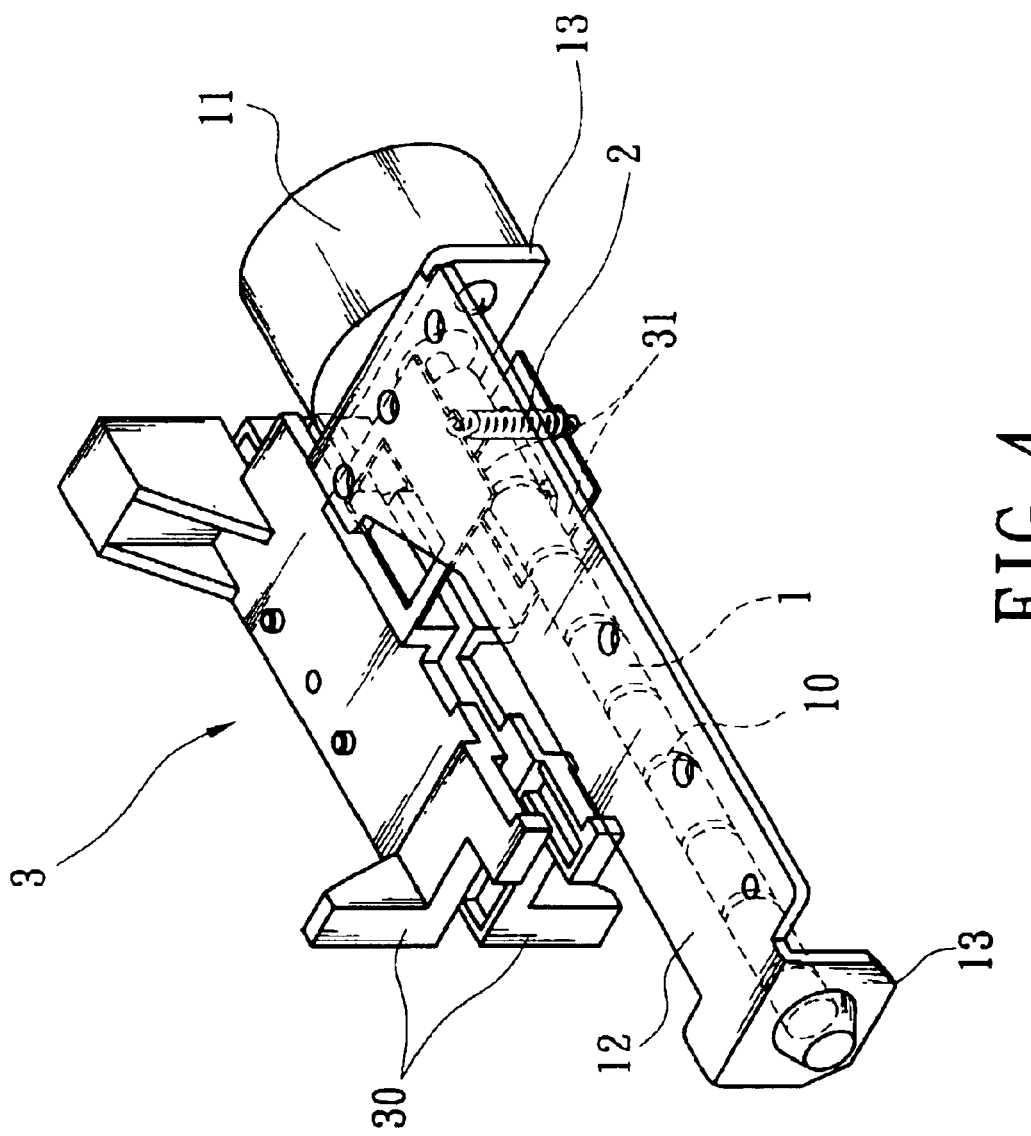
FIG. 4 is a perspective view of the invention.

Referring to FIGS. 3 and 4, the sled apparatus for an optical head frame of the invention comprises a lead screw 1, an elastic element 2 and two opposing racks 3. The lead screw 1 is an elongated round rod with helical screw threads 10 formed on the peripheral surface and may be driven to rotate by a motor 11 (a DC motor or stepping motor). The lead screw 1 has two ends pivotally engaged with two flanges 13 located at two ends of a support frame 12. The support frame 12 is mounted to an optical disk drive (not shown in the drawings) at a selected location for holding the lead screw 1 and motor 11.

The elastic element 2 may be an extension spring having two ends formed respectively a hook 20.

Figure 6:
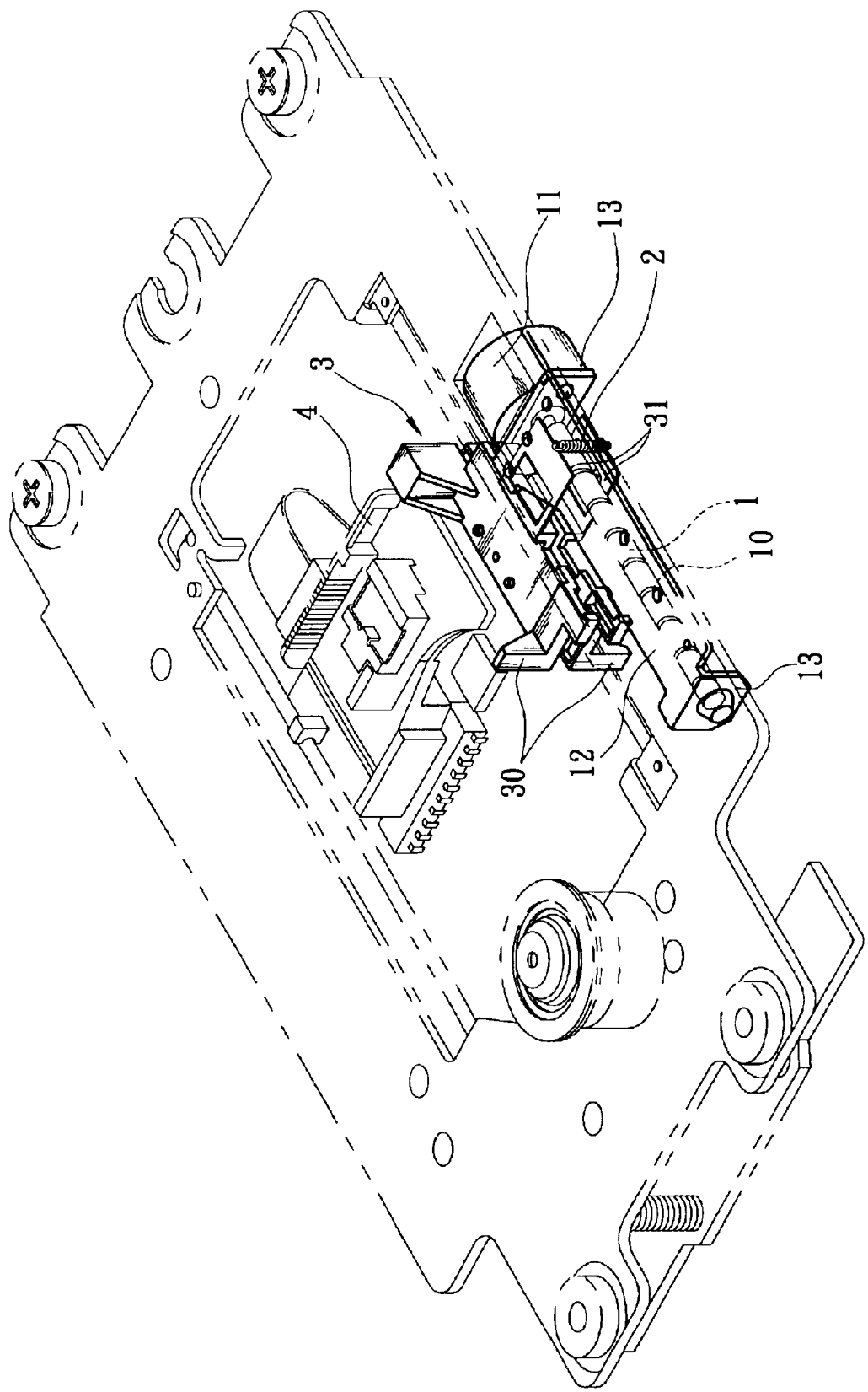
FIG. 6 is a schematic view of the invention in use.

The two opposing racks 3 are located respectively on the upper and the lower side of the lead screw 1. Each of the racks 3 has a bracket 30 at one end and a resilient section 31 at another end connecting to the bracket 30. The bracket 30 is fixedly fastened to an optical head frame 4 (as shown in FIG. 6).

The resilient sections 31 of racks 30 have respectively a hook section 32 facing each other to engage with the hook 20 of the elastic element 2. The resilient section 31 has one or more teeth 33 matching and engageable with the screw threads 10 of the lead screw 1 such that the lead screw 1 is clamped by the racks 3 from two sides.

Figure 5:
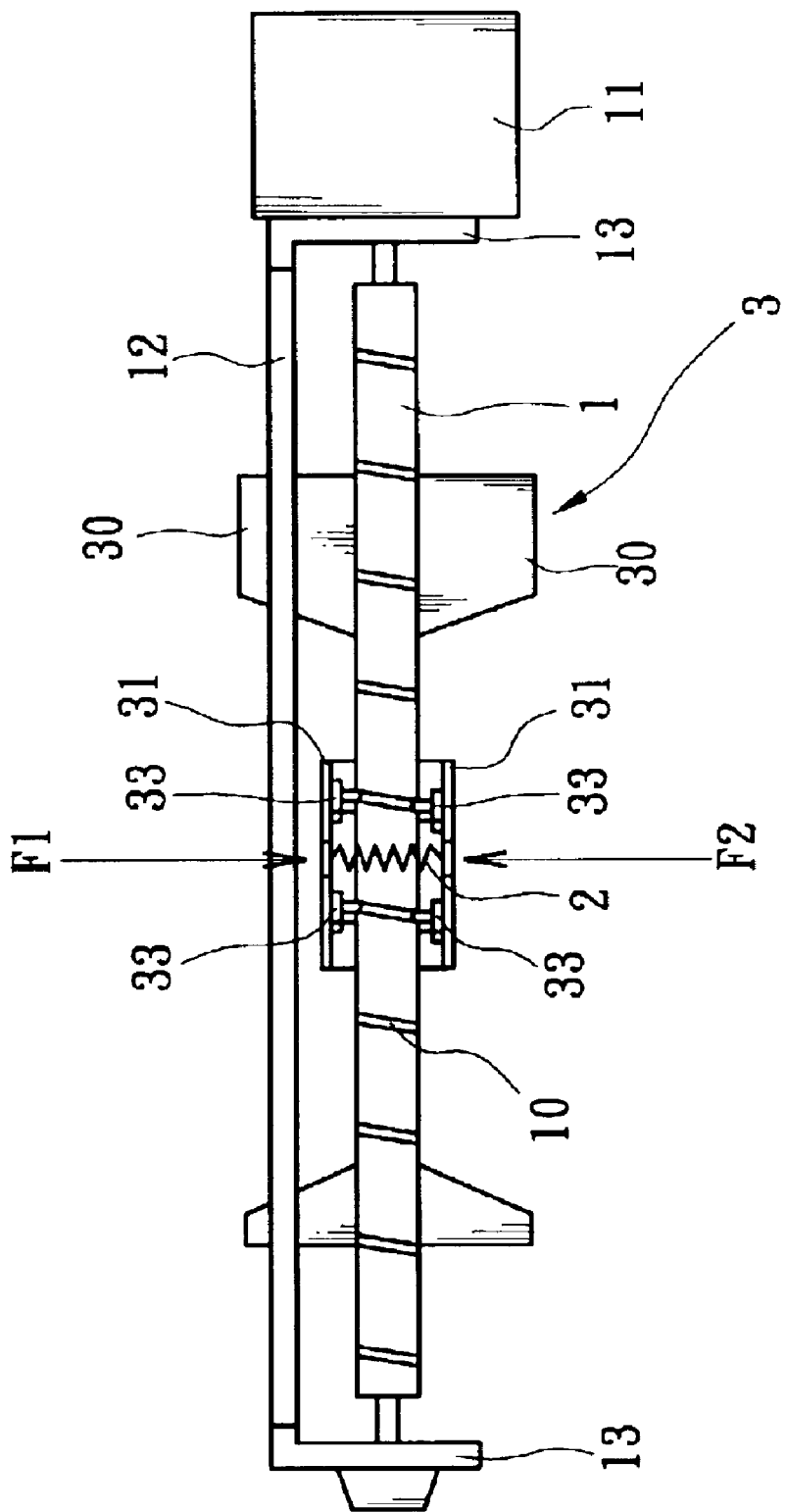
FIG. 5 is a front view of the invention.

Referring to FIG. 5, the elastic element 2 has a sufficient pre-load force exerting on the upper and lower racks 3 to clamp the lead screw 1. The pre-load force incurs an action force F1 and a reaction force F2 applying on the two racks 3, hence the loading force at two ends of the lead screw 1 is reduced, and the friction force which the motor 11 must overcomes when driving the lead screw 1 can also be reduced. As a result, the rotation may be transmitted smoothly and reliably from the motor 11 to the lead screw 1, and the optical head frame 4 will also be moved rapidly and smoothly to achieve effective data reading for the optical disk drive.

By means of aforesaid construction, the sled apparatus of the invention employs an upper and a lower rack 3 to absorb the action force F1 and reaction force F2 of a pre-load force such that the two ends of the lead screw 1 do not have to bear the reaction force of the pre-load force, thereby the driving force of the motor 11 can be transmitted effectively and smoothly to overcome the disadvantages that incur to the conventional techniques.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. A sled apparatus for an optical head frame of an optical disk drive, comprising:

a lead screw, the lead screw having a longitudinal axis and two ends;

an elastic element, the elastic element being disposed perpendicularly to the longitudinal axis of the lead screw; and two opposing racks each having one end fixedly fastened to the optical head frame and another end engaged with the elastic element for clamping and engaging with the lead screw, thereby reducing a loading force at the two ends of the lead screw.

2. The sled apparatus for an optical head frame of an optical disk drive of claim 1, wherein the lead screw is a rod with helical screw threads formed thereon.

3. The sled apparatus for an optical head frame of an optical disk drive of claim 1, wherein the lead screw is driven to rotate by a motor.

4. The sled apparatus for an optical head frame of an optical disk drive of claim 3, wherein the motor is selectively a DC motor or a stepping motor.

5. The sled apparatus for an optical head frame of an optical disk drive of claim 1, wherein the elastic element is an extension spring.

6. The sled apparatus for an optical head frame of an optical disk drive of claim 1, wherein the two racks are located respectively on an upper side and a lower side of the lead screw.

7. The sled apparatus for an optical head frame of an optical disk drive of claim 1, wherein the two racks have respectively teeth located an another end to engage with the lead screw.

8. The sled apparatus for an optical head frame of an optical disk drive of claim 1, further having a support frame mounted to the optical disk drive for holding the lead screw.

* * * * *